US009512698B2

(12) United States Patent
Donderici et al.

(10) Patent No.: US 9,512,698 B2
(45) Date of Patent: Dec. 6, 2016

(54) FERROFLUID TOOL FOR PROVIDING MODIFIABLE STRUCTURES IN BOREHOLES

(71) Applicant: HALLIBURTON ENERGY SERVICES, INC., Houston, TX (US)

(72) Inventors: Burkay Donderici, Houston, TX (US); Baris Guner, Kingwood, TX (US); George David Goodman, Houston, TX (US); Wesley Neil Ludwig, Fort Worth, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/423,726

(22) PCT Filed: Dec. 30, 2013

(86) PCT No.: PCT/US2013/078259
§ 371 (c)(1),
(2) Date: Feb. 25, 2015

(87) PCT Pub. No.: WO2015/102568
PCT Pub. Date: Jul. 9, 2015

(65) Prior Publication Data
US 2016/0047204 A1    Feb. 18, 2016

(51) Int. Cl.
*E21B 41/00* (2006.01)
*E21B 33/12* (2006.01)
(Continued)

(52) U.S. Cl.
CPC .............. *E21B 41/00* (2013.01); *E21B 33/12* (2013.01); *E21B 47/12* (2013.01); *G01V 3/10* (2013.01)

(58) Field of Classification Search
CPC .......... B09C 1/00; E21B 33/138; E21B 43/25; E21B 47/1015; E21B 49/00
See application file for complete search history.

(56) References Cited

U.S. PATENT DOCUMENTS 3,984,918 A   10/1976   Chaney
4,035,718 A    7/1977   Chandler
(Continued)

FOREIGN PATENT DOCUMENTS

GB       2222680       3/1990
PL        397294       6/2013
(Continued)

OTHER PUBLICATIONS

Dickstein et al., Labyrinthine Pattern Formation in Magnetic Fluids, Science, New Series, vol. 261, No. 5124, Aug. 20, 1993, pp. 1012-1015.
(Continued)

*Primary Examiner* — James G Sayre
(74) *Attorney, Agent, or Firm* — Kilpatrick Townsend & Stockton LLP (57) ABSTRACT

A tool for providing modifiable structures in a wellbore using ferrofluids in a downhole system is provided. The downhole system can include a tool body, a source of ferrofluid, and a magnet. The magnet can magnetically couple with the ferrofluid from the source for arranging the ferrofluid adjacent for modifying a parameter of an object coupled with or in the tool body when the tool body is positioned in the wellbore.

24 Claims, 5 Drawing Sheets

(51) Int. Cl.
*E21B 47/12* (2012.01)
*G01V 3/10* (2006.01)

(56) References Cited

U.S. PATENT DOCUMENTS

| | | | |
|---|---|---|---|
| 4,350,955 A | 9/1982 | Jackson et al. | |
| 4,356,098 A | 10/1982 | Chagnon | |
| 4,424,974 A | 1/1984 | Mitsuya et al. | |
| 4,444,398 A | 4/1984 | Black et al. | |
| 4,502,700 A | 3/1985 | Gowda et al. | |
| 4,526,379 A | 7/1985 | Raj | |
| 4,604,222 A | 8/1986 | Borduz et al. | |
| 4,604,229 A | 8/1986 | Raj et al. | |
| 4,630,243 A | 12/1986 | MacLeod | |
| 4,630,943 A | 12/1986 | Stahl et al. | |
| 4,691,774 A | 9/1987 | Nelson | |
| 4,802,534 A | 2/1989 | Larson et al. | |
| 4,845,988 A | 7/1989 | Russell et al. | |
| 4,865,334 A | 9/1989 | Raj et al. | |
| 4,991,438 A | 2/1991 | Evans | |
| 5,007,513 A | 4/1991 | Carlson | |
| 5,092,611 A | 3/1992 | Ehmsen et al. | |
| 5,429,000 A | 7/1995 | Raj et al. | |
| 5,452,520 A | 9/1995 | Raj et al. | |
| 5,474,302 A | 12/1995 | Black et al. | |
| 5,475,309 A | 12/1995 | Hong et al. | |
| 5,780,741 A | 7/1998 | Raj | |
| 5,850,624 A | 12/1998 | Gard et al. | |
| 6,216,787 B1 | 4/2001 | Ruttley | |
| 6,250,848 B1 * | 6/2001 | Moridis | B09C 1/00 166/292 |
| 6,257,356 B1 | 7/2001 | Wassell | |
| 6,290,894 B1 | 9/2001 | Raj et al. | |
| 6,305,694 B1 | 10/2001 | Yamazumi et al. | |
| 6,681,849 B2 | 1/2004 | Goodson, Jr. | |
| 6,817,415 B2 | 11/2004 | Orban et al. | |
| 7,021,406 B2 | 4/2006 | Zitha | |
| 7,063,146 B2 | 6/2006 | Schultz et al. | |
| 7,063,802 B2 | 6/2006 | Tsuda et al. | |
| 7,159,675 B2 | 1/2007 | Eigner et al. | |
| 7,204,581 B2 | 4/2007 | Peeters | |
| 7,219,752 B2 | 5/2007 | Wassell et al. | |
| 7,428,922 B2 * | 9/2008 | Fripp | E21B 21/10 166/66.5 |
| 7,743,825 B2 | 6/2010 | O'Malley et al. | |
| 7,763,175 B2 | 7/2010 | DeCoster et al. | |
| 7,779,933 B2 | 8/2010 | Sihler et al. | |
| 7,950,672 B2 | 5/2011 | Shimazaki et al. | |
| 8,056,246 B1 | 11/2011 | Hopper et al. | |
| 8,269,501 B2 | 9/2012 | Schmidt et al. | |
| 8,286,705 B2 | 10/2012 | Ocalan et al. | |
| 8,328,199 B2 | 12/2012 | Oshita | |
| 8,360,170 B2 | 1/2013 | Leuchtenberg | |
| 8,419,019 B2 | 4/2013 | Kung | |
| 2003/0166470 A1 | 9/2003 | Fripp et al. | |
| 2004/0084184 A1 | 5/2004 | Orban et al. | |
| 2008/0290876 A1 | 11/2008 | Ameen | |
| 2009/0008078 A1 | 1/2009 | Patel | |
| 2009/0025928 A1 | 1/2009 | Lee | |
| 2009/0179385 A1 | 7/2009 | Komino et al. | |
| 2010/0019514 A1 | 1/2010 | Steinwender | |
| 2010/0126716 A1 * | 5/2010 | Joseph | E21B 41/00 166/244.1 |
| 2010/0224360 A1 | 9/2010 | MacDougall et al. | |
| 2010/0267594 A1 | 10/2010 | Rana et al. | |
| 2011/0056681 A1 | 3/2011 | Khan | |
| 2011/0108277 A1 | 5/2011 | Dudley et al. | |
| 2011/0186297 A1 * | 8/2011 | Zhang | C09K 8/70 166/308.1 |
| 2011/0192573 A1 | 8/2011 | Defretin et al. | |
| 2011/0297265 A1 | 12/2011 | Kahoe et al. | |
| 2011/0297394 A1 | 12/2011 | VanDelden | |
| 2013/0020066 A1 | 1/2013 | Ocalan et al. | |
| 2013/0091941 A1 | 4/2013 | Huh et al. | |
| 2013/0112911 A1 | 5/2013 | Mazyar et al. | |
| 2013/0119995 A1 | 5/2013 | Wootten | |
| 2013/0139565 A1 | 6/2013 | Hedtke | |
| 2013/0169278 A1 | 7/2013 | Bittar et al. | |
| 2015/0315868 A1 | 11/2015 | Fripp et al. | |
| 2015/0345250 A1 | 12/2015 | Murphree et al. | |
| 2016/0032688 A1 | 2/2016 | Donderici et al. | |
| 2016/0040506 A1 | 2/2016 | Goodman et al. | |
| 2016/0040507 A1 | 2/2016 | Donderici et al. | |

FOREIGN PATENT DOCUMENTS

| | | |
|---|---|---|
| WO | 0161713 | 8/2001 |
| WO | 2005038189 | 4/2005 |
| WO | 2009142779 | 11/2009 |
| WO | 2013012967 | 1/2013 |
| WO | 2015094266 | 6/2015 |
| WO | 2015094274 | 6/2015 |
| WO | 2015102561 | 7/2015 |
| WO | 2015102563 | 7/2015 |
| WO | 2015102566 | 7/2015 |

OTHER PUBLICATIONS

Gollwitzer et al., The Surface Topography of a Magnetic Fluid—A Quantitative Comparison Between Experiment and Numerical Simulation, Journal of Fluid Mechanics, May 2006, pp. 1-21.
Grundfos, The Centrifugal Pump, Company Datasheet, Dec. 2003, 128 pages.
Horak et al., Experimental and Numerical Determination of the Static Critical Pressure in Ferrofluid Seals, Journal of Physics: Conference Series, vol. 412, 2013, pp. 1-6.
Pant et al., Synthesis and characterization of ferrofluid-conducting polymer composite, Indian Journal of Engineering and Materials Sciences, vol. 11, Aug. 2004., pp. 267-270.
International Patent Application No. PCT/US2013/078259, International Search Report and Written Opinion, mailed Sep. 29, 2014, 14 pages.
Raj et al., Advances in ferrofluid technology, Journal of Magnetism and Magnetic Materials, vol. 149, 1995, pp. 174-180.
Rosenweig, Magnetic Fluid Motion in Rotating Field, Journal of Magnetism and Magnetic Materials, vol. 85, Issues 1-3, Apr. 1990, pp. 171-180.

* cited by examiner

FERROFLUID TOOL FOR PROVIDING MODIFIABLE STRUCTURES IN BOREHOLES

CROSS-REFERENCE TO RELATED APPLICATIONS

This is a U.S. national phase under 35 U.S.C. 371 of International Patent Application No. PCT/US2013/078259, titled "Ferrofluid Tool for Providing Modifiable Structures in Boreholes" and filed Dec. 30, 2013, the entirety of which is incorporated herein by reference.

TECHNICAL FIELD

The present disclosure relates generally to devices for use in a wellbore in a subterranean formation and, more particularly (although not necessarily exclusively), to tools for providing modifiable structures in a wellbore using ferrofluids.

BACKGROUND

Various devices can be placed in a well traversing a hydrocarbon bearing subterranean formation. A variety of environmental conditions can be encountered in the well. Different devices can be suitable or unsuitable for use in the well based on the particular environmental conditions encountered in the well. Accounting for different environmental conditions that can be encountered in the well, such as by deploying multiple devices suited for different environments on a single tool string or by extracting a tool string from the well to substitute a device better suited to the environment encountered, can increase cost, time, and complexity of well operations.

DETAILED DESCRIPTION

Certain aspects of the present disclosure are directed to ferrofluid tools for providing modifiable structures in a wellbore. Ferrofluids, which may also be known as liquid magnets, can include materials for which position, size, and shape can be controlled using external magnetic fields. A ferrofluid tool can include a ferrofluid source for introducing ferrofluid and a magnet for providing a magnetic field. The ferrofluid source or the magnet (or both) can be controlled when the tool is in a wellbore to position the ferrofluid in or near the tool. The ferrofluid can modify a parameter of an object in the wellbore. The object may be a part of the tool. Non-limiting examples of parameters include the size, shape, position, orientation, or function (or some combination thereof) of the object. For example, the ferrofluid can extend the length of an electrode sensor. In another example, the ferrofluid can be positioned to produce a new part of the tool. In another example, the ferrofluid can be moved between multiple positions relative to a sensor to provide multiple sensor readings that can be used for calibrating the sensor. In another example, the ferrofluid can provide a temporary conduit connected with the tool for carrying communication signals. Using ferrofluid to modify structures in the wellbore can reduce costs, time, and complexity associated with accounting for different environmental conditions that can be encountered in the well.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "above," "below," "upper," "lower," "upward," "downward," "left" "right" etc. in relation to the illustrative aspects as they are depicted in the figures, the upward direction being toward the top of the corresponding figure and the downward direction being toward the bottom of the corresponding figure. Like the illustrative aspects, the numerals and directional descriptions included in the following sections should not be used to limit the present disclosure.

Figure 1:
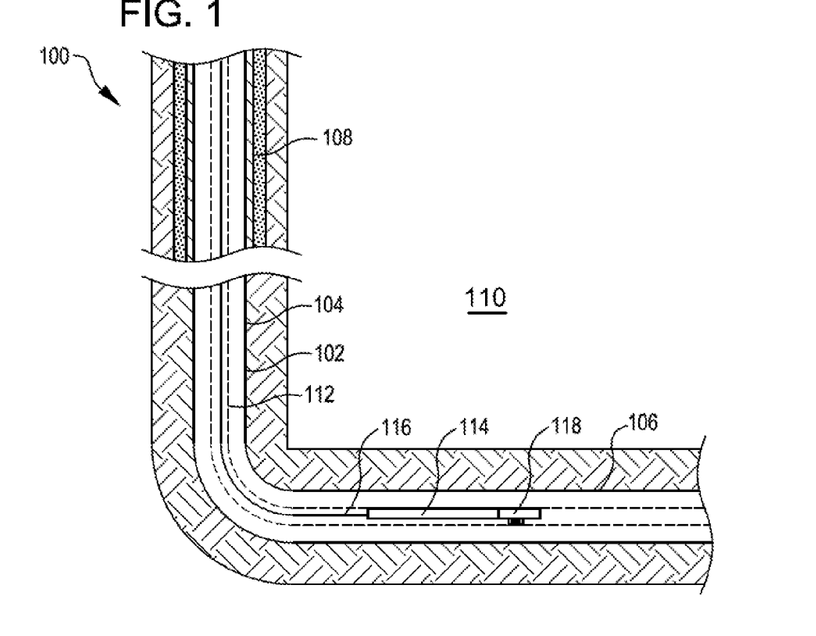
FIG. 1 is a schematic illustration of a well system having a ferrofluid tool according to one aspect of the present disclosure.

FIG. 1 schematically depicts an example of a well system 100 having a ferrofluid tool 118 that can use ferrofluids to produce modifiable structures in a wellbore 102. Although the well system 100 is depicted with one ferrofluid tool 118, any number of ferrofluid tools can be used in the well system 100. The well system 100 includes a bore that is a wellbore 102 extending through various earth strata. The wellbore 102 has a substantially vertical section 104 and a substantially horizontal section 106. The substantially vertical section 104 and the substantially horizontal section 106 can include a casing string 108 cemented at an upper portion of the substantially vertical section 104. The substantially horizontal section 106 extends through a hydrocarbon bearing subterranean formation 110.

A tubing 112 string within the wellbore 102 can extend from the surface to the subterranean formation 110. The tubing 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface.

The ferrofluid tool 118 can be part of a tool string 114. The ferrofluid tool 118 can be the sole tool in the tool string 114, or the tool string 114 can include other downhole tools (including other ferrofluid tools). The tool string 114 can be deployed into the well system 100 on a wire 116. The tool string 114 can be deployed into the tubing 112 or independent of the tubing 112. In some aspects, the tool string 114 can be deployed as part of the tubing 112 and the wire 116 can be omitted. In other aspects, the tool string 114 can be deployed in a portion of a well system 100 that does not include tubing 112.

Although FIG. 1 depicts the ferrofluid tool 118 in the substantially horizontal section 106, the ferrofluid tool 118 can be located, additionally or alternatively, in the substantially vertical section 104. In some aspects, the ferrofluid tool 118 can be disposed in simpler wellbores, such as wellbores having only a substantially vertical section 104. In some aspects, the ferrofluid tool 118 can be disposed in more complex wellbores, such as wellbores having portions disposed at various angles and curvatures. The ferrofluid tool 118 can be disposed in openhole environments, as depicted in FIG. 1, or in cased wells.

Figure 2:
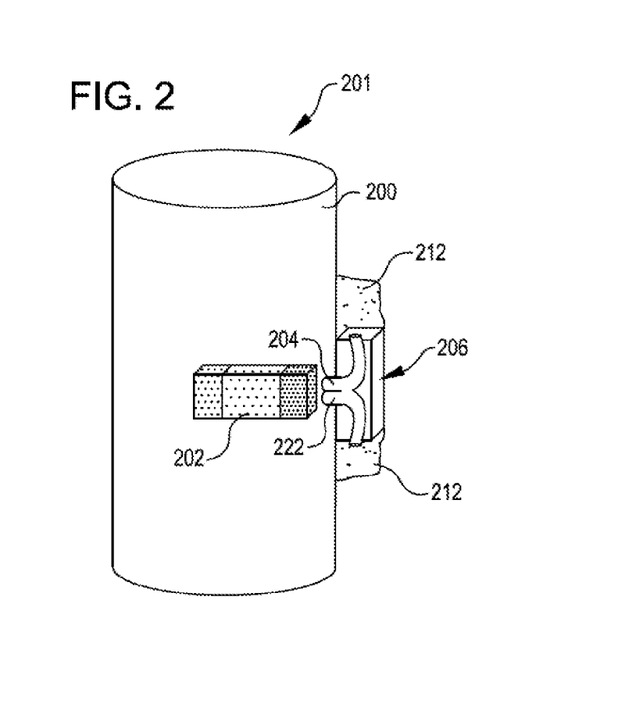
FIG. 2 is a cross-sectional view of an example of a ferrofluid tool for modifying an electrode according to one aspect of the present disclosure.

Other types of ferrofluid tools can be used alternatively or additionally in the well system 100 depicted in FIG. 1. FIG. 2 is a cross-sectional view of an example of a ferrofluid tool 201 for modifying an electrode 206 according to one aspect.

The ferrofluid tool 201 can include a tool body 200, a magnet 202, a ferrofluid source 204, an electrode 206, and a ferrofluid collector 222. In some aspects, the tool body 200 is part of a tool string, such as the tool string 114 of FIG. 1. In some aspects, the ferrofluid source 204, the magnet 202, the electrode 206, the ferrofluid collector 222, or some combination thereof can be controlled by a system control center in communication with the ferrofluid tool 201. The magnet 202 can be positioned in or connected with the tool body 200. For example, the magnet 202 can be on the tool body 200, directly connected to the tool body 200, or connected with the tool body 200 through intervening components or structure. Non-limiting examples of the magnet 202 include an electromagnet, a permanent magnet, and a device for producing magnetic fields. The ferrofluid source 204 or the ferrofluid collector 222 (or both) can be positioned in or connected with the tool body 200. The ferrofluid source 204 or the ferrofluid collector 222 (or both) can be located near the magnet 202. In some aspects, the ferrofluid source 204 or the ferrofluid collector 222 (or both) can include a nozzle or a port (or both). The electrode 206 can be located connected with an exterior of the tool body 200 or within the tool body 200.

The ferrofluid source 204 can introduce ferrofluid 212 into a region adjacent to the electrode 206. The ferrofluid 212 can be electrically conductive. The magnet 202 can magnetically couple with the ferrofluid 212. The magnet 202 can exert an external magnetic field upon the ferrofluid 212. The magnetic field exerted on the ferrofluid 212 can cause the ferrofluid 212 to align with the magnetic field. The magnetic field can shape and orient the ferrofluid 212. The magnetic field can position the ferrofluid 212 in contact with the electrode 206. Contact between the ferrofluid 212 and the electrode 206 can alter the shape or size of the electrode 206. For example, the ferrofluid 212 can extend the length of the electrode 206.

The ferrofluid collector 222 can recover ferrofluid 212 introduced by the ferrofluid source 204. The ferrofluid collector 222 can collect ferrofluid 212 to contract or reduce the shape or the size of the electrode 206. The ferrofluid collector 222 can convey collected ferrofluid 212 to the ferrofluid source 204. The ferrofluid source 204 can introduce ferrofluid 212 to expand the shape or size of the electrode 206. The ferrofluid 212 can be controlled by the ferrofluid source 204, the ferrofluid collector 222, the magnet 202, or some combination thereof. Controlling the ferrofluid 212 can arrange the ferrofluid 212 in a pattern. The pattern can be adjusted for altering the transmitting or receiving (or both) characteristics of the electrode 206. For example, the pattern can be adjusted such that the electrode 206 can transmit or receive (or both) signals for measuring sensitive regions located at different distances or orientations from the electrode 206.

Figure 3:
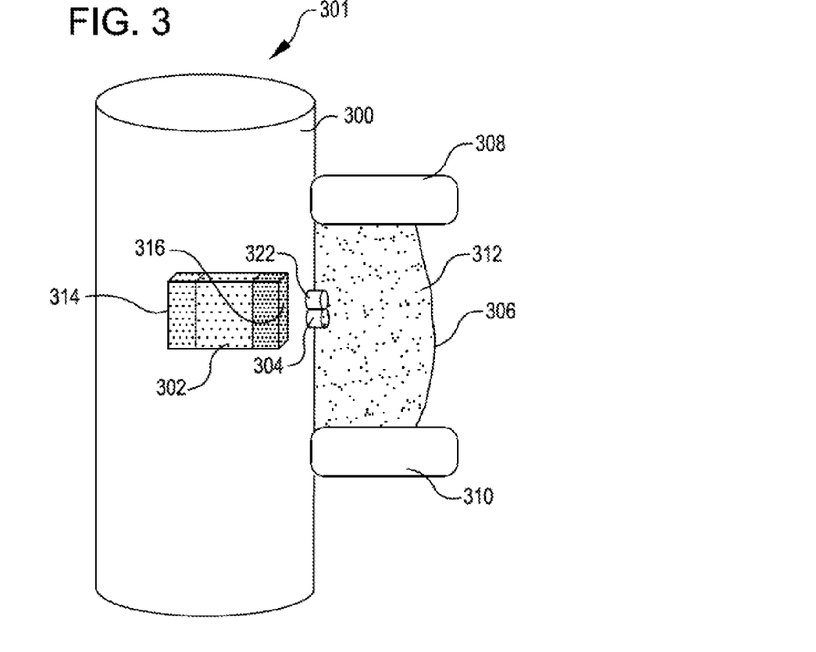
FIG. 3 is a cross-sectional view of an example of a ferrofluid tool for producing a polymorphic electrode-type sensor according to one aspect of the present disclosure.

Although the ferrofluid tool 201 is depicted in FIG. 2 with ferrofluid 212 for modifying an electrode 206, other arrangements are possible. In some aspects, ferrofluid produces a new component rather than modifying an existing component. FIG. 3 is a cross-sectional view of an example of a ferrofluid tool 301 for producing a polymorphic electrode-type sensor 306 according to another aspect.

The ferrofluid tool 301 can include a tool body 300, a magnet 302, a ferrofluid source 304, a ferrofluid collector 322, and one or more ferrofluid isolators 308, 310. In some aspects, the tool body 300 is part of a tool string, such as the tool string 114 of FIG. 1. In some aspects, the ferrofluid source 304, the magnet 302, the ferrofluid collector 322, or some combination thereof can be controlled by a system control center in communication with the ferrofluid tool 301. The magnet 302 can be positioned in or connected with the tool body 300. The ferrofluid source 304 or the ferrofluid collector 322 (or both) can be positioned in or connected with the tool body 300. The ferrofluid source 304 or the ferrofluid collector 322 (or both) can be located near the magnet 302. In some aspects, the ferrofluid source 304 or the ferrofluid collector 322 (or both) can include a nozzle or a port (or both). A first ferrofluid isolator 308 and a second ferrofluid isolator 310 can be positioned external to the tool body 300. The ferrofluid isolators 308, 310 can be positioned near the ferrofluid source 304.

The ferrofluid source 304 can introduce ferrofluid 312 into a region within or adjacent to the tool body 300. The ferrofluid 312 can be electrically conductive. The magnet 302 can exert an external magnetic field upon the ferrofluid 312. The magnetic field exerted on the ferrofluid 312 can cause the ferrofluid 312 to align with the magnetic field. The magnetic field can shape and orient the ferrofluid 312. The magnetic field can position the ferrofluid 312 as a discrete block. Electrical energy can be communicated from the ferrofluid tool 301 to the ferrofluid 312. In one example, the ferrofluid source 304 can conduct electrical energy to the ferrofluid 312 introduced by the ferrofluid source 304. Communicating electrical energy to the ferrofluid 312 can produce an electrode-type sensor 306 of ferrofluid 312. The electrode-type sensor 306 of ferrofluid 312 can be polymorphic, having an adjustable size or shape. In some aspects, adjusting the size or shape can adjust the position or orientation of the polymorphic electrode-type sensor 306.

The ferrofluid collector 322 can recover ferrofluid 312 introduced by the ferrofluid source 304. The ferrofluid collector 322 can collect ferrofluid 312 to contract the shape or the size of the electrode-type sensor 306 of ferrofluid 312. The ferrofluid collector 322 can convey collected ferrofluid 312 to the ferrofluid source 304. The ferrofluid source 304 can introduce ferrofluid 312 to expand the shape or size of the electrode-type sensor 306 of ferrofluid 312. The ferrofluid 312 can be controlled by the ferrofluid source 304, the ferrofluid collector 322, the magnet 302, or some combination thereof. Controlling the ferrofluid 312 can arrange the ferrofluid 312 in a pattern. The pattern can be adjusted to alter the transmitting or receiving (or both) characteristics of the electrode-type sensor 306 of ferrofluid 312. For example, the pattern can be adjusted such that the electrode-type sensor 306 can transmit or receive differing signals at different distances or at different orientations relative to the electrode-type sensor 306. Such variability can allow measurement of sensitive volumes located at different distances or orientations relative to the electrode-type sensor 306.

The magnet 302 can include a first pole 316 and a second pole 314 having opposite polarities. Magnetic particles in the ferrofluid 312 can align with the magnetic field of the magnet 302 such that the ferrofluid 312 can be attracted toward either of poles 314, 316. The attraction toward both poles 314, 316 can cause the ferrofluid 312 to tend to spread out along the face of the tool body 300 to follow the minimum magnetic path length between the two poles 314, 316. In some aspects, the magnet 302 can be placed off-center in the tool body 300 and closer to the ferrofluid source 304. Such placement can shift the minimum magnetic path length between the two poles 314, 316 and reduce the tendency of the ferrofluid 312 to spread out. In some aspects, the ferrofluid isolators 308, 310 can obstruct the path of the ferrofluid 312 as the ferrofluid 312 spreads and prevent the ferrofluid 312 from spreading out along the face of the tool body 300. The ferrofluid isolators 308, 310 can be constructed of material having low magnetic permeability. An example of material from which the ferrofluid isolators 308, 310 can be constructed includes rubber. The ferrofluid isolators 308, 310 can retain the ferrofluid 312 in the magnetic field of the magnet 302 in a shape protruding from the face of the tool body 300 defined between the ferrofluid isolators 308, 310.

The ferrofluid isolators 308, 310 can guide the ferrofluid 312 from the ferrofluid source 304. For example, an upper ferrofluid isolator 308 and a lower ferrofluid isolator 310 can be positioned respectively above and below the ferrofluid source 304 such that the ferrofluid 312 is substantially retained in a vertical region between the ferrofluid isolators 308, 310. In another example, the ferrofluid isolators 308, 310 can be positioned, respectively, laterally to the left and right of the ferrofluid source 304 such that the ferrofluid 312 is substantially retained in a lateral region or a horizontal region between the ferrofluid isolators 308, 310. Any number, shape, or arrangement (or combination thereof) of ferrofluid isolators 308, 310 can be used to retain ferrofluid 312 in a region bounded by at least one ferrofluid isolator 308, 310. The ferrofluid isolators 308, 310 can be positioned for providing boundaries or definition (or both) for the shape of the ferrofluid 312. The ferrofluid isolators 308, 310 can provide control of the shape of the ferrofluid 312 that supplements the control provided by some combination of the ferrofluid source 304, the ferrofluid collector 322, or the magnet 302.

Figure 4:
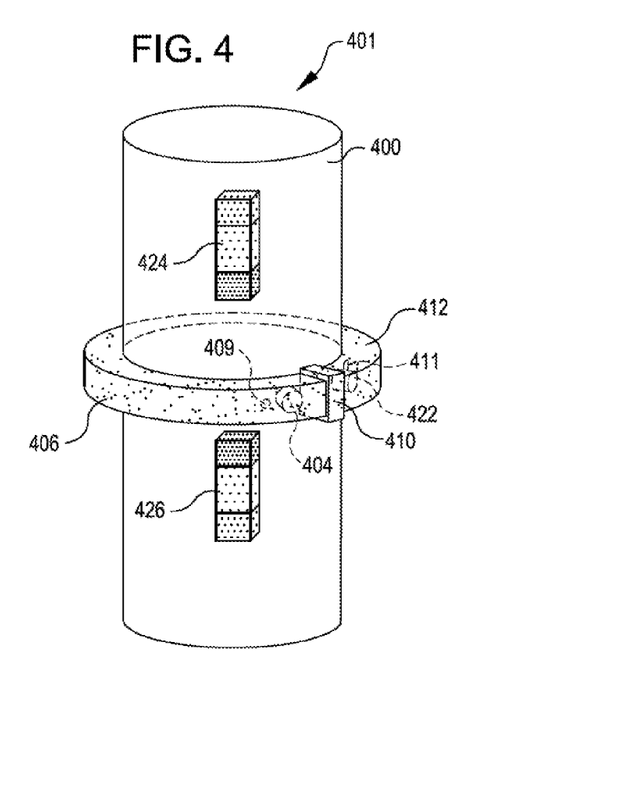
FIG. 4 is a perspective view of an example of a ferrofluid tool for producing a polymorphic coil-type antenna according to one aspect of the present disclosure.

FIG. 4 is a perspective view of an example of a ferrofluid tool 401 for producing a polymorphic coil-type antenna 406 according to one aspect. The ferrofluid tool 401 can include a tool body 400, a ferrofluid source 404, a ferrofluid isolator 410, a ferrofluid collector 422, first magnet 424, and a second magnet 426. In some aspects, the tool body 400 is part of a tool string, such as the tool string 114 of FIG. 1. In some aspects, the ferrofluid source 404, the magnets 424, 426, the ferrofluid collector 422, or some combination thereof can be controlled by a system control center in communication with the ferrofluid tool 401. The magnets 424, 426 can be positioned in or connected with the tool body 400. The ferrofluid source 404 or the ferrofluid collector 422 (or both) can be positioned in or connected with the tool body 400. The ferrofluid source 404 or the ferrofluid collector 422 (or both) can be located near the magnets 424, 426. In some aspects, the ferrofluid source 404 or the ferrofluid collector 422 (or both) can include a nozzle or a port (or both). The ferrofluid isolator 410 can be connected with the tool body 400. The ferrofluid isolator can be positioned between the ferrofluid source 404 and the ferrofluid collector 422.

The first magnet 424 and the second magnet 426 can be positioned opposite one another with poles of the same polarity pointing together. The first magnet 424 and the second magnet 426 so configured can produce an elongated magnetic field extending away from the center of the magnets 424, 426 in a radial pattern in the region between the magnets 424, 426. The ferrofluid source 404 can introduce ferrofluid 412 within or adjacent to the tool body 400. The ferrofluid source 404 can introduce ferrofluid 412 into the elongated magnetic field region. The magnetic field can shape and orient the ferrofluid 412. The magnetic field can position the ferrofluid 412 as a discrete block. The ferrofluid 412 can align in a radial pattern in response to the magnetic field produced by the magnets 424, 426. For example, the magnetic field can arrange the ferrofluid 412 as a coil. In some aspects, the magnetic field can arrange the ferrofluid 412 in a radially omnidirectional shape about an exterior portion of the tool body 400.

The ferrofluid 412 can be electrically conductive. Communicating electrical energy to a coil of ferrofluid 412 can produce a coil-type antenna 406 of ferrofluid 412. In some aspects, the coil-type antenna 406 of ferrofluid 412 can be used as a transmitter. For example, oscillating current flow in the coil-type antenna 406 of ferrofluid 412 around the ferrofluid tool 401 can create induction in a wellbore formation near the ferrofluid tool 401 for detecting characteristics of the formation. In one example, current may be fed to the transmitting coil-type antenna 406 of ferrofluid 412 by establishing a potential difference between two ports 409, 411 of the coil-type antenna 406 of ferrofluid 412. For example, one port 409 may include a small electrode near a point where the ferrofluid 412 is released by the ferrofluid source 404, while the other port 411 may include another small electrode near the ferrofluid collector 422. By establishing a voltage difference between the two electrodes at the ports 409, 411, a current flow from the electrode with the higher potential to the electrode with the lower potential can be obtained. To maintain this current flow in a single direction between the ports 409, 411, the ports 409, 411 can be isolated from one another in a certain direction using a ferrofluid isolator 410 positioned between the ports 409, 411 in the certain direction. The isolation may additionally or alternatively be established by gravitational forces. In one example, in a horizontal or highly deviated well, gravity can pull the ferrofluid 412 in a direction toward the center of the earth and establish isolation in a zone located relative to the ferrofluid tool 401 in a direction toward the sky. In some aspects, the coil-type antenna 406 of ferrofluid 412 can be additionally or alternatively used as a receiver. In one example, the ferrofluid tool 401 can be electrically connected with the ferrofluid 412 for receiving electrical energy induced by the formation.

The coil-type antenna 406 of ferrofluid 412 can be polymorphic, having an adjustable size or shape. In some aspects, adjusting the size or shape can adjust the position or orientation of the polymorphic coil-type antenna 406. In some aspects, the ferrofluid tool 401 can be controlled to dynamically generate, form, or remove (or some combination thereof) the polymorphic coil-type antenna 406.

The ferrofluid collector 422 can recover ferrofluid 412 introduced by the ferrofluid source 404. The ferrofluid collector 422 can collect ferrofluid 412 to contract the shape or the size of the coil-type antenna 406 of ferrofluid 412. The ferrofluid collector 422 can convey collected ferrofluid 412 to the ferrofluid source 404. The ferrofluid source 404 can introduce ferrofluid 412 to expand the shape or size of the coil-type antenna 406 of ferrofluid 412. For example, the ferrofluid 412 can expand an outer diameter of the coil-type antenna 406. The ferrofluid 412 can be controlled by the ferrofluid source 404, the ferrofluid collector 422, the magnets 424, 426, or some combination thereof. Controlling the ferrofluid 412 can arrange the ferrofluid 412 in a pattern. The pattern can be adjusted to alter transmitting or receiving (or both) characteristics of the coil-type antenna 406 of ferrofluid 412. For example, the pattern can be adjusted such that the coil-type antenna 406 can transmit or receive (or both) signals for measuring sensitive regions located at different distances or orientations from the coil-type antenna 406. In some aspects, adjusting the shape of the coil-type antenna 406 of ferrofluid 412 can increase a signal-to-noise ratio for the coil-type antenna 406. In some aspects, adjusting the shape for the coil-type antenna 406 can change a tilt angle for optimizing the configuration of the coil-type antenna 406 with respect to the formation that is being observed. In some aspects, some combination of the shape, size, position, or orientation of multiple coils of ferrofluid 412 in a coil-type antenna 406 can be adjusted for adjusting the relative positions of main and bucking induction coils to reduce direct coupling signals between transmitters and receivers in the coil-type antenna 406.

Although the ferrofluid tool 401 is depicted in FIG. 4 as having two magnets 424, 426, one ferrofluid source 404, one ferrofluid collector 422, and one coil-type antenna 406 of ferrofluid 412, other arrangements are possible. For example, the ferrofluid tool 401 can include multiple ferrofluid sources or multiple ferrofluid collectors. In another example, the ferrofluid tool 401 can have additional magnets and additional coil-type sensors of ferrofluid. In some aspects, the ferrofluid tool 401 can include ferrofluid isolators, other types of polymorphic ferrofluid sensors (such as electrode-type sensors), or some combination of these and other components discussed herein. Including polymorphic ferrofluid sensors in a tool can reduce the size and weight of the tool.

Figure 5:
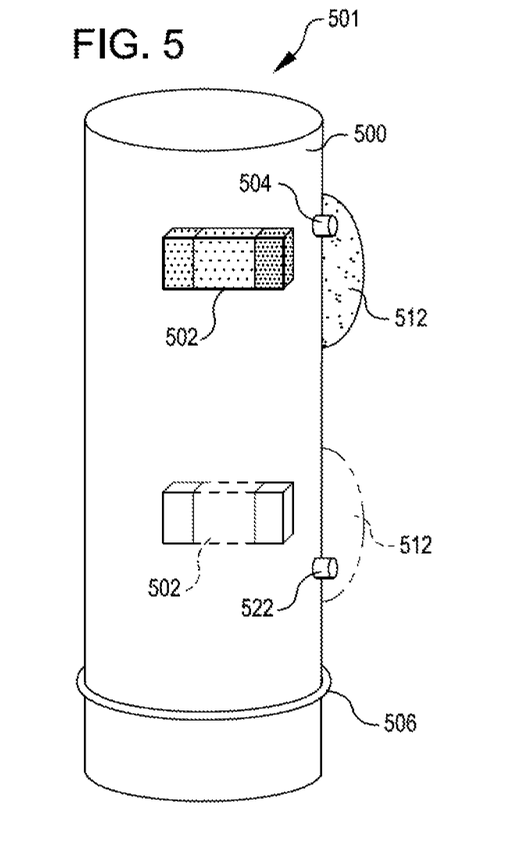
FIG. 5 is a cross-sectional view of an example of a ferrofluid tool for calibrating a sensor according to one aspect of the present disclosure.

FIG. 5 is a cross-sectional view of an example of a ferrofluid tool 501 for calibrating a sensor 506 according to one aspect. The ferrofluid tool 501 can include a tool body 500, a magnet 502, a ferrofluid source 504, a ferrofluid collector 522, and a sensor 506. In some aspects, the tool body 500 is part of a tool string, such as the tool string 114 of FIG. 1. In some aspects, the ferrofluid source 504, the magnet 502, the ferrofluid collector 522, or some combination thereof can be controlled by a system control center in communication with the ferrofluid tool 501. The magnet 502 can be positioned in or connected with the tool body 500. The ferrofluid source 504 or the ferrofluid collector 522 (or both) can be positioned in or connected with the tool body 500. The ferrofluid source 504 or the ferrofluid collector 522 (or both) can be located near the magnet 502. In some aspects, the ferrofluid source 504 or the ferrofluid collector 522 (or both) can include a nozzle or a port (or both). The sensor 506 can be positioned in or connected with the tool body 500.

The ferrofluid source 504 can introduce ferrofluid 512 into a region within or adjacent to the tool body 500. The magnet 502 can exert an external magnetic field upon the ferrofluid 512. The magnetic field exerted on the ferrofluid 512 can cause the ferrofluid 512 to align with the magnetic field. The magnetic field can shape and orient the ferrofluid 512. The magnetic field can position the ferrofluid 512 as a discrete block.

The magnetic field provided by the magnet 502 can be movable relative to the tool body 500. In some aspects, the magnetic field can be moved by repositioning the magnet 502. In one example, the magnet 502 is a permanent magnet that can be repositioned by movement of a pneumatic or hydraulic piston. In some aspects, the magnetic field can be moved without repositioning the magnet 502. In one example, the magnet 502 is an electromagnet that can move the magnetic field in response to a change in electrical energy provided to the electromagnet. The ferrofluid 512 can change configuration (e.g., position or orientation—including shape or size—relative to the tool body 500) in response to movement of the magnetic field provided by the magnet 502.

The sensor 506 can be calibrated based on a configuration of the ferrofluid 512. For example, a reading obtained by the sensor 506 in the presence of a certain configuration of ferrofluid 512 can provide an indication of the accuracy of readings from the sensor 506. Subsequent readings can be adjusted accordingly to calibrate the sensor 506 and improve measurements based on readings from the sensor 506. In some aspects, the sensor 506 can be calibrated based on a change in configuration of the ferrofluid 512. The sensor 506 can obtain multiple readings corresponding to varied configurations of the ferrofluid 512. The multiple readings can be compared to values that are expected based on the configuration change made to the ferrofluid 512. The expected values can be based on earlier simulation or testing. In a non-limiting example, the ferrofluid source 504 introduces a known amount of ferrofluid 512. The ferrofluid 512 magnetically couples with the magnetic field of the magnet 502 in a first position (depicted in solid lines in FIG. 5). The sensor 506 obtains a first resistivity reading when the ferrofluid 512 is in the first position. The magnet 502 and the magnetically coupled ferrofluid 512 are moved downward relative to the tool body 500 to a second position (depicted in dashed lines in FIG. 5). The sensor 506 obtains a second resistivity reading when the ferrofluid 512 is in the second position. The change between the first and second resistivity readings is compared to a computer simulation of movement of the known amount of ferrofluid 512 the distance between the first and second positions. A coefficient is determined based on the difference between the readings and the computer simulation values. The sensor 506 is calibrated to increase the accuracy of measurements by modifying subsequent readings obtained by the sensor 506 by the determined coefficient.

The ferrofluid collector 522 can recover ferrofluid 512 introduced by the ferrofluid source 504. The ferrofluid collector 522 can convey collected ferrofluid 512 to the ferrofluid source 504. In some aspects, the ferrofluid source 504 or the ferrofluid collector 522 (or both) are moveable with the magnet 502 for moving the ferrofluid 512. In one example, both the ferrofluid source 504 and the ferrofluid collector 522 move with the magnet 502 for respectively expanding or contracting the size of the ferrofluid 512 by respectively introducing or collecting ferrofluid 512. In some aspects, the ferrofluid source 504 and the ferrofluid collector 522 are not moveable. In one example, the ferrofluid source 504 and the ferrofluid collector 522 are located apart from one another. The ferrofluid source 504 can introduce ferrofluid 512 at a first position for coupling with the magnet 502. The magnet 502 can move the ferrofluid 512 to a second position at which the ferrofluid collector 522 can collect the ferrofluid 512. In another example, the ferrofluid source 504 and the ferrofluid collector 522 are adjacent to one another. The ferrofluid source 504 can introduce ferrofluid 512 at a first position for coupling with the magnet 502. The magnet 502 can move with the ferrofluid 512 downward to a second position for calibration purposes and upward to the first position for collection by the ferrofluid collector 522.

Although the ferrofluid tool 501 is depicted in FIG. 5 with a single sensor 506, other arrangements are possible. For example, the ferrofluid tool 501 can include multiple sensors. In some aspects, one configuration change of ferrofluid 512 can be used in calibrating multiple sensors.

Figure 6:
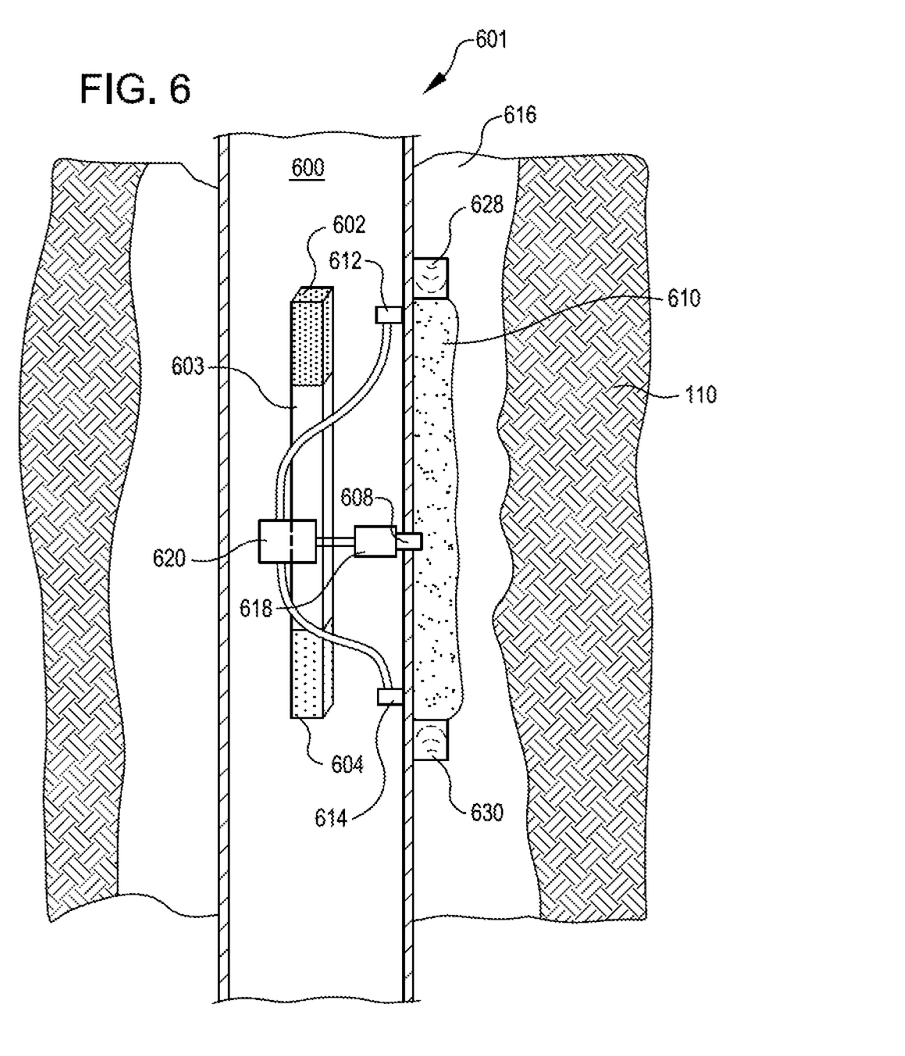
FIG. 6 is a cross-sectional view of an example of a ferrofluid tool for providing a temporary communication link according to one aspect of the present disclosure.

FIG. 6 is a cross-sectional view of an example of a ferrofluid tool 601 for providing a temporary communication link according to one aspect. The ferrofluid tool 601 can include a tool body 600, a magnet 603, a ferrofluid source 608, a first ferrofluid collector 612, a second collector 614, a tank 618, a first communication device 628, a second communication device 630, and a filter 620.

In some aspects, the tool body 600 is part of a tool string, such as the tool string 114 of FIG. 1. In some aspects, the ferrofluid source 608, the magnet 603, the ferrofluid collectors 612, 614, the first communication device 628, the second communication device 630, or some combination thereof can be controlled by a system control center in communication with the ferrofluid tool 601. The magnet 603 can be positioned in or connected with the tool body 600. The ferrofluid source 608 or the ferrofluid collectors 612, 614 (or both) can be positioned in or connected with the tool body 600. The ferrofluid source 608 or the ferrofluid collectors 612, 614 (or both) can be located near the magnet 603. The first communication device 628 and second communication device 630 can be positioned in or connected with the tool body 600.

Ferrofluid 610 can be conveyed from the tank 618 via the ferrofluid source 608. The ferrofluid source 608 can be a port or nozzle or any other structure for conveying ferrofluid 610. The magnet 603 can include a first pole 602 and a second pole 604 having opposite polarities. Magnetic particles in the ferrofluid 610 can align with the magnetic field of the magnet 603 such that the ferrofluid 610 can be attracted toward either of poles 602, 604. The attraction toward both poles 602, 604 can cause the ferrofluid 610 to tend to spread out along the face of the tool body 600 to follow the minimum magnetic path length between the two poles 602, 604.

The ferrofluid 610 can be arranged to span between the first communication device 628 and the second communication device 630. The ferrofluid 610 can define a path for carrying communication signals between the first communication device 628 and the second communication device 630. Non-limiting examples of types of communication signals that can be communicated by the path defined by the ferrofluid 610 include acoustic, electrical, inductive, or optical. In some aspects, signals can be carried through the ferrofluid 610. In other aspects, signals can be carried through a region bounded by ferrofluid 610. In some aspects, one of the communication devices 628, 630 is solely a transmitter and the other is solely a receiver. In other aspects, both communication devices 628, 630 can each send and receive communication signals. In one example, the ferrofluid tool 601 can include a first communication link of ferrofluid 610 for transmitting signals from the first communication device 628 to the second communication device 630 and a distinct second communication link of ferrofluid 610 for transmitting signals from the second communication device 630 to the first communication device 628. In some aspects, a communication link of ferrofluid 610 can be used in place of cables.

Ferrofluid collectors 612 and 614 can be positioned in the path of the ferrofluid 610. For example, ferrofluid collectors 612, 614 can be positioned near the poles 602, 604 of the magnet 603. Positioning ferrofluid collectors 612, 614 near the poles 602, 604 can draw ferrofluid 610 toward the ferrofluid collectors 612, 614. Ferrofluid collectors 612, 614 can collect ferrofluid 610. In some aspects, the ferrofluid collectors 612, 614 can include nozzles or ports (or both). Ferrofluid 610 collected by one or more ferrofluid collectors 612, 614 can be conveyed to the filter 620. The filter 620 can separate ferrofluid 610 from wellbore fluids conveyed with ferrofluid 610 via one or more ferrofluid collectors 612, 614. The ferrofluid 610 collected by the ferrofluid collectors 612 or 614 or both can be conveyed to the tank 618. Collecting ferrofluid 610 and conveying it to the tank 618 can conserve ferrofluid 610 used in operation of the ferrofluid tool 601. In some aspects, alternately introducing ferrofluid 610 by the ferrofluid source 608 and collecting ferrofluid 610 by the ferrofluid collectors 612, 614 can selectively establish or remove a path for signal communication.

Although the ferrofluid tool 601 is depicted in FIG. 6 as having one magnet 603 and two ferrofluid collectors 612, 614 for providing a single communication link, other arrangements are possible. In some aspects, the ferrofluid tool 601 can include multiple magnets or alternative magnetic arrangements. For example, sections of a casing of the tool body 600 can be magnetized for magnetically coupling with ferrofluid 610 to provide communication links. In some aspects, the ferrofluid tool 601 can include more or less than two collectors. In one example, two or more magnets can be used to attract the ferrofluid 610 to a particular collector. In some aspects, the ferrofluid tool 601 can include ferrofluid isolators, polymorphic ferrofluid sensors, or some combination of these and other components discussed herein.

Figure 7:
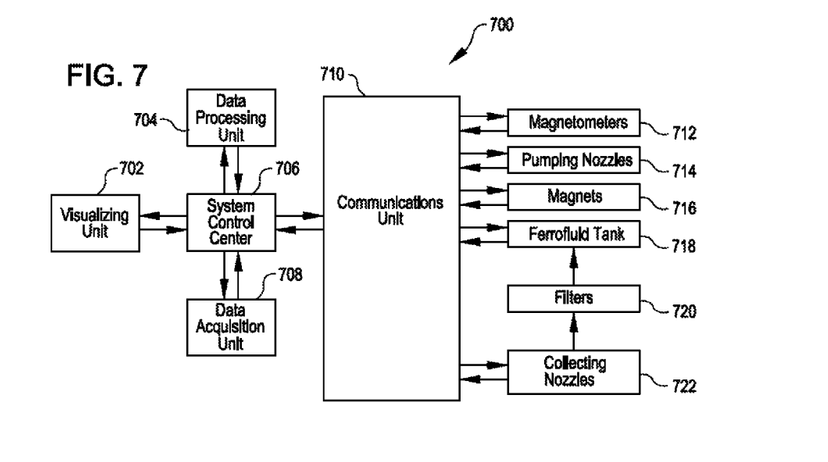
FIG. 7 is a block diagram depicting an example of a system for using ferrofluid for providing modifiable structures in a wellbore according to one aspect of the present disclosure.

FIG. 7 is a block diagram depicting an example of a system 700 for using ferrofluid for providing modifiable structures in a wellbore according to one aspect. The system 700 can include a system control center 706, a visualizing unit 702, a data processing unit 704, a data acquisition unit 708, a communications unit 710, magnetometers 712, pumping nozzles (or other ferrofluid sources) 714, magnets 716, ferrofluid tank 718, filters 720, and collecting nozzles (or other ferrofluid collectors) 722. The system 700 can include more or fewer than all of these listed components.

The system control center 706 can control the operation of the system 700. The system control center 706 can include a processor device and a non-transitory computer-readable medium on which machine-readable instructions can be stored. Examples of non-transitory computer-readable medium include random access memory (RAM) and read-only memory (ROM). The processor device can execute the instructions to perform various actions, some of which are described herein. The actions can include, for example, communicating with other components of the system 700.

The system control center 706 can communicate via the communications unit 710. For example, the system control center 706 can send commands to initiate the pumping nozzles 714 via the communications unit 710. The communications unit 710 can also communicate information about components to the system control center 706. For example, the communications unit 710 can communicate a status of the pumping nozzle 714, such as pumping or not, to the system control center 706.

The system control center 706 can receive information via communications unit 710 from magnetometers 712. Magnetometers 712 can be configured to detect a presence of ferrofluids in the annulus. For example, the magnetometers 712 can detect a level of ferrofluid introduced into the annulus by the pumping nozzle 714 (or other source of ferrofluid). The magnetometer 712 can also detect a level of ferrofluid at a position away from the pumping nozzle 714 to detect a level of ferrofluid that has escaped from the magnetic field of magnets 716. The system control center 706 can also communicate via the communications unit 710 with the magnetometers 712. For example, the system control center 706 can send instructions for the magnetometers 712 to initiate or terminate detection.

The system control center 706 can also communicate via the communications unit 710 with the magnets 716. For example, the system control center 706 can send instructions to initiate or terminate magnetic fields provided by the magnet 716. For example, the magnet 716 can be an electromagnet and the system control center 706 can provide instructions regarding whether to provide current to the electromagnet to cause the electromagnet to produce a magnetic field. The system control center 706 can also communicate with the magnets 716 to provide instructions to move the magnets 716 or adjust the magnetic field produced by the magnets 716. Movement of the magnets 716 or the magnetic field produced by the magnets 716 can provide additional control over ferrofluids positioned in the wellbore. The magnet 716 can also communicate with the system control center 706 via the communications unit 710, such as regarding the strength of the magnetic field the magnet 716 is producing.

The system control center 706 can also communicate via the communications unit 710 with the collecting nozzles 722. For example, the system control center 706 can send instructions to the collecting nozzles 722 to initiate collection of ferrofluids from the wellbore. The system control center 706 can initiate the collecting nozzles 722 based on information received from the magnetometers 712, the pumping nozzles 714, the magnets 716, or any combination thereof. The communications unit 710 can also communicate information about the collecting nozzles 722 to the system control center 706. For example, the communications unit 710 can communicate a status of the collecting nozzle 722, such as pumping or not, or how much ferrofluid is being collected by the collecting nozzle 722.

The system control center 706 can also communicate via the communications unit 710 with the ferrofluid tank 718. For example, the system control center 706 can receive information from the ferrofluid tank 718 regarding the status of the ferrofluid tank 718, such as how full the ferrofluid tank 718 is. The system control center 706 can also initiate or terminate collection by the collecting nozzles 722 based on the information received from the ferrofluid tank 718. The system control center 706 can provide instructions to the ferrofluid tank 718 to initiate filling of the ferrofluid tank 718 from another source distinct from the collecting nozzles 722, such as from a line for refilling the ferrofluid tank 718 from the surface.

One or more filters 720 can be provided to separate ferrofluid fluid from wellbore fluid in the fluid that has been collected by collecting nozzles 722. The filter 720 can convey collected ferrofluid into the ferrofluid tank 718. The system control center 706 can also communicate with the filter 720 via communications unit 710. For example, the system control center 706 can send instructions to the filter 720 regarding whether the filter 720 is to perform its filtering function based on the information received by the magnetometers 712, the collecting nozzles 722, etc. The communications unit 710 can also communicate information about the filters 720 to the system control center 706. For example, the communications unit 710 can communicate a status of the filters 720 (such as filtering or not), how much ferrofluid is being filtered by the filters 720, or whether the filters 720 need to be changed or not.

The system control center 706 can also be in communication with a data acquisition unit 708. The data acquisition unit 708 can acquire data from any of the units depicted in FIG. 7 or any other sensors that are included in the system 700.

The system control center 706 can also be in communication with a data processing unit 704. The data processing unit 704 can include a processor device and a non-transitory computer-readable medium on which machine-readable instructions can be stored. The processor device can execute the instructions to perform various actions, some of which are described herein. As a non-limiting example, the data processing unit 704 can process data acquired by the data acquisition unit 708. For example, the data processing unit 704 can provide information based on acquired data that is used for determining whether to activate pumping nozzles 714, operate magnets 716, or operate collecting nozzles 722, or any combination thereof.

The system control center 706 can also be in communication with a visualizing unit 702. The visualizing unit 702 can provide an interface for an operator of the system 700 to check system operation and input intervening commands if necessary. Such intervening commands can override default or preset conditions earlier entered or used by the system control center 706.

Visualizing unit 702, data processing unit 704, system control center 706, data acquisition unit 708, and communications unit 710 can be positioned or located at the surface of a well system 100. Alternatively, one or multiple of these components can also be located in a tool positioned within a wellbore rather than at the surface.

Figure 8:
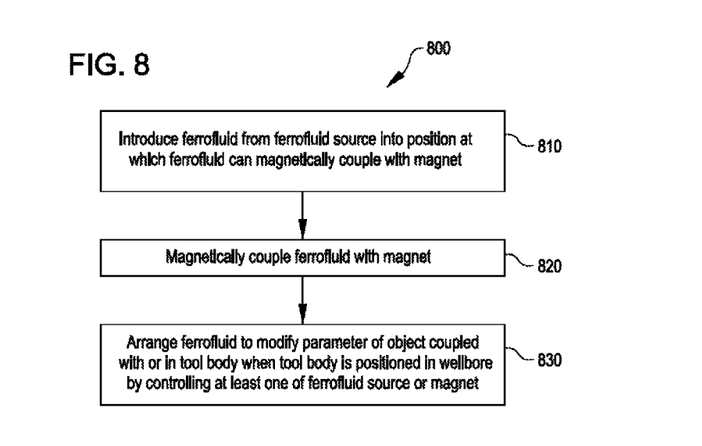
FIG. 8 is a flow chart illustrating an example method for providing modifiable structures in a wellbore using ferrofluids according to one aspect of the present disclosure.

FIG. 8 is a flow chart illustrating an example method 800 for providing modifiable structures in a wellbore using ferrofluids according to one aspect of the present disclosure. The method can include introducing ferrofluid from a ferrofluid source into a position at which the ferrofluid can magnetically couple with the magnet, as shown in block 810. The ferrofluid source can be part of a downhole system having a tool body, the ferrofluid source, and a magnet. For example, a ferrofluid tool such as ferrofluid tool 201 (described above with respect to FIG. 2) can be utilized in the method 800.

The method can include magnetically coupling the ferrofluid with the positioning magnet, as shown in block 820. The method can include arranging the ferrofluid to modify a parameter of an object coupled with or in the tool body when the tool body is positioned in a wellbore by controlling at least one of the ferrofluid source or the magnet, as shown in block 830.

A ferrofluid can be a substance in which ferromagnetic particles are suspended in a carrier liquid. A ferrofluid can be a solution in which ferromagnetic particles are a solute dissolved in a carrier liquid solvent. The ferromagnetic particles in a ferrofluid can move freely inside the carrier liquid without settling out of the carrier liquid. The ferromagnetic particles inside a ferrofluid can be randomly distributed in the absence of an external magnetic field such that there is no net magnetization. Applying an external magnetic field to a ferrofluid can cause magnetic moments of the ferromagnetic particles to align with the external magnetic field to create a net magnetization. A shape or position (or both) of a ferrofluid can be controlled by changing a strength or a gradient (or both) of an external magnetic field applied to the ferrofluid.

Surfactants can be used in manufacturing ferrofluids. Surfactants can prevent ferromagnetic particles from adhering together, which can otherwise cause the ferromagnetic particles to form heavier clusters that could precipitate out of the solution.

Many different combinations of ferromagnetic particle, surfactant, and carrier fluid can be utilized to produce a ferrofluid. The variety of combinations can provide extensive opportunities to optimize the properties of a ferrofluid to a particular application. In one example, appropriate selection of the materials composing a ferrofluid can provide a ferrofluid that is more electrically conductive or more electrically resistive in accordance with the goals of a particular application.

Examples of ferromagnetic particles that can be used in ferrofluids include cobalt, iron, and iron-cobalt compounds (such as magnetite). A ferrofluid can use ferromagnetic particles of a single kind, a single composition, or a variety of kinds or compositions. Dimensions of the ferromagnetic particles in a ferrofluid can be small, e.g., in the order of nanometers (nm). In one example, a ferrofluid can have an average ferromagnetic particle size of 10 nm.

Examples of surfactants that can be used in ferrofluids include cis-oleic acid, tetramethylammonium hydroxide, citric acid, and soy-lecithin. In some applications, the type of surfactant used can be a determining factor in the useful life of a ferrofluid. In various applications, a ferrofluid can be a stable substance that can be reliably used for several years before the surfactants lose effectiveness.

Examples of carrier fluids include water-based fluids and oil-based fluids. In one example, a ratio by weight in a ferrofluid can be 5% ferromagnetic particles, 10% surfactants, and 85% carrier liquid.

In some aspects, a system, an assembly, a tool, or a method is provided for isolating objects in a wellbore using ferrofluids according to one or more of the following examples. In some aspects, a tool, assembly, or system described in one or more of these examples can be utilized to perform a method described in one of the other examples.

Example #1

A method can include introducing, by a downhole system having a tool body, a ferrofluid source, and a magnet, ferrofluid from the ferrofluid source into a position at which the ferrofluid can magnetically couple with the magnet. The method can include magnetically coupling the ferrofluid with the magnet. The method can include arranging the ferrofluid to modify a parameter of an object coupled with or in the tool body when the tool body is positioned in a wellbore by controlling at least one of the ferrofluid source or the magnet.

Example #2

The method of Example #1 may include producing the object from the ferrofluid.

Example #3

The method of any of Examples #1-2 may feature an object that is a polymorphic sensor. The method may include modifying a size, a shape, a position, an orientation, or a function of the polymorphic sensor.

Example #4

The method of any of Examples #1-3 can include changing a position of the ferrofluid relative to the tool body. The method can include calibrating a sensor based at least in part on the changed position of the ferrofluid.

Example #5

The method of any of Examples #1-4 can include arranging the ferrofluid to provide a communication link between a first communication device and a second communication device.

Example #6

A downhole system can include a tool body, a source of ferrofluid, and a magnet. The source of ferrofluid can be coupled with or in the tool body. The magnet can be magnetically coupled with the ferrofluid from the source. The magnet can be magnetically coupled with ferrofluid from the source. The magnet can be positioned to arrange the ferrofluid to modify a parameter of an object coupled with or in the tool body when the tool body is positioned in a wellbore.

Example #7

The downhole system of Example #6 may feature a parameter that is at least one of size, shape, position, orientation, or function.

Example #8

The downhole system of any of Examples #6-7 may feature a magnet that is positioned to arrange the ferrofluid to produce the object from the ferrofluid.

Example #9

The downhole system of any of Examples #6-8 may feature an object that is a polymorphic sensor.

Example #10

The downhole system of Example #9 may feature a magnet that is positioned to arrange the ferrofluid to modify a distance or orientation at which the polymorphic sensor transmits or receives signals.

Example #11

The downhole system of any of Examples #9-10 may feature a polymorphic sensor that includes an electrode. The magnet can be positioned to arrange the ferrofluid to extend a length parameter of the electrode.

Example #12

The downhole system of any of Examples #9-11 may feature a polymorphic sensor that includes a coil. The magnet can be positioned to arrange the ferrofluid to expand a diameter parameter of the coil.

Example #13

The downhole system of any of Examples #6-12 may feature at least two ferrofluid isolators positioned along a face of the tool body such that the ferrofluid is retained in a shape protruding from the face between the at least two ferrofluid isolators.

Example #14

The downhole system of any of Examples #6-13 may feature a system control center programmed with instructions to control the source of ferrofluid or the magnet in arranging the ferrofluid to modify the parameter of the object by at least one of providing commands to the source of ferrofluid to introduce the ferrofluid or providing commands to the magnet to magnetically couple with the ferrofluid.

Example #15

The downhole system of any of Examples #6-14 may feature a source of ferrofluid positioned to control a flow of the ferrofluid into a position at which the ferrofluid magnetically couples with the magnet.

Example #16

A downhole system may feature a tool body, a magnet coupled with or in the tool body, and a source of ferrofluid. The source of ferrofluid can be positioned to arrange the ferrofluid by controlling a flow of the ferrofluid into a position at which the ferrofluid magnetically couples with the magnet to modify a parameter of an object coupled with or in the tool body when the tool body is positioned in a wellbore.

Example #17

The downhole system of any of Examples #6-16 may feature a sensor. The magnet can be magnetically coupled with ferrofluid from the source to modify a position parameter of the ferrofluid relative to the tool body to calibrate the sensor.

Example #18

The downhole system of any of Examples #6-17 may feature a magnet that is moveable relative to the tool body to modify the position parameter of the ferrofluid magnetically coupled with the magnet.

Example #19

The downhole system of any of Examples #6-18 may feature a first communication device and a second communication device. The magnet can be magnetically coupled with ferrofluid from the source to modify a shape parameter of the ferrofluid relative to the tool body to provide a communication link between the first and the second communication devices.

Example #20

The downhole system of Example #19 may feature ferrofluid that is arranged to carry communication signals through the ferrofluid between the first and the second communication devices.

Example #21

The downhole system of any of Examples #6-20 may feature a system control center programmed with machine readable instructions to control at least one of the source of ferrofluid or the magnet in arranging the ferrofluid adjacent to or within the tool body by at least one of providing commands to the source to control the flow of ferrofluid or providing commands to the magnet to magnetically couple with the ferrofluid Example #22

A system can include a ferrofluid source, a magnet, and a system control center. The ferrofluid source can be positioned to introduce ferrofluid. The magnet can be magnetically coupled with the ferrofluid that is introduced by the ferrofluid source. The system control center may be in communication with at least one of the source of ferrofluid or the magnet. The system control center can be programmed with machine-readable instructions to arrange the ferrofluid to modify a parameter of an object coupled with or in a tool body when the tool body is positioned in a wellbore. The system control center may arrange the ferrofluid by at least one of providing commands to the ferrofluid source or providing commands to the magnet. The system control center may provide commands to the ferrofluid source to introduce the ferrofluid. The system control center may provide commands to the magnet to magnetically couple with the ferrofluid.

Example #23

The downhole system of any of Examples #14, 15, 21, or 22 may feature a system control center that is communicatively coupled with the ferrofluid source and programmed with machine-readable instructions to increase a size parameter of the object by providing commands to the ferrofluid source to introduce the ferrofluid.

Example #24

The downhole system of any of Examples #14, 15, 21, 22, or 23 may feature a ferrofluid collector positioned to collect the ferrofluid. The system control center can be communicatively coupled with the ferrofluid collector and programmed with machine-readable instructions to reduce a size parameter of the object by providing commands to the ferrofluid collector to collect the ferrofluid.

Example #25

The downhole system of any of Examples #14, 15, 21, 22, 23, or 24 may feature a ferrofluid collector positioned to collect the ferrofluid. The object can be made of the ferrofluid. The system control center can be communicatively coupled with the ferrofluid collector and programmed with machine-readable instructions to remove the object by providing commands to the ferrofluid collector to collect the ferrofluid.

The foregoing description of the aspects, including illustrated examples, of the disclosure has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:
1. A method comprising:
   introducing, by a downhole system having a tool body, a ferrofluid source, and a magnet, ferrofluid ejected from the ferrofluid source into a position at which the ferrofluid can magnetically couple with the magnet;
magnetically coupling the ferrofluid ejected from the ferrofluid source with the magnet; and
arranging the ferrofluid to modify a parameter of an object coupled with or in the tool body when the tool body is positioned in a wellbore by controlling at least one of the ferrofluid source or the magnet;
wherein arranging the ferrofluid to modify the parameter of the object includes:
modifying a size, a shape, a position, an orientation, or a function of a polymorphic sensor comprised by the object;
changing a position of the ferrofluid relative to the tool body to facilitate calibrating a sensor based at least in part on the changed position of the ferrofluid;
arranging the ferrofluid to provide a communication link between a first communication device and a second communication device; or
collecting the ferrofluid via a ferrofluid collector to at least one of reduce a size parameter of the object or remove the object.

2. The method of claim 1, wherein arranging the ferrofluid to modify the parameter of the object includes producing the object from the ferrofluid.

3. The method of claim 1, wherein the object is the polymorphic sensor and arranging the ferrofluid to modify the parameter of the object includes modifying the size, the shape, the position, the orientation, or the function of the polymorphic sensor.

4. The method of claim 1, further comprising:
changing the position of the ferrofluid relative to the tool body; and
calibrating the sensor based at least in part on the changed position of the ferrofluid.

5. The method of claim 1, wherein arranging the ferrofluid to modify the parameter of the object includes arranging the ferrofluid to provide the communication link between the first communication device and the second communication device.

6. The method of claim 1, wherein arranging the ferrofluid to modify the parameter of the object includes collecting the ferrofluid via a ferrofluid collector to at least one of reduce a size parameter of the object or remove the object.

7. A downhole system, comprising:
a tool body;
a source of ferrofluid coupled with or in the tool body; and
a magnet magnetically coupled with ferrofluid ejected from the source and positioned to arrange the ferrofluid to modify a parameter of a polymorphic sensor coupled with or in the tool body when the tool body is positioned in a wellbore.

8. The downhole system of claim 7, wherein the parameter is at least one of size, shape, position, orientation, or function.

9. The downhole system of claim 7, wherein the magnet is positioned to arrange the ferrofluid to produce the polymorphic sensor from the ferrofluid.

10. The downhole system of claim 7, wherein the magnet is positioned to arrange the ferrofluid to modify a distance or orientation at which the polymorphic sensor transmits or receives signals.

11. The downhole system of claim 7, wherein the polymorphic sensor includes an electrode; and
wherein the magnet is positioned to arrange the ferrofluid to extend a length parameter of the electrode.

12. The downhole system of claim 7, wherein the polymorphic sensor includes a coil; and
wherein the magnet is positioned to arrange the ferrofluid to expand a diameter parameter of the coil.

13. The downhole system of claim 7, further comprising at least two ferrofluid isolators positioned along a face of the tool body such that the ferrofluid is retained in a shape protruding from the face between the at least two ferrofluid isolators.

14. The downhole system of claim 7, further comprising a system control center programed with instructions to control the source of ferrofluid or the magnet in arranging the ferrofluid to modify the parameter of the polymorphic sensor by at least one of providing commands to the source of ferrofluid to introduce the ferrofluid or providing commands to the magnet to magnetically couple with the ferrofluid.

15. The downhole system of claim 14, wherein the source is positioned to control a flow of the ferrofluid into a position at which the ferrofluid magnetically couples with the magnet.

16. A downhole system comprising:
a tool body;
a magnet coupled with or in the tool body;
a source of ferrofluid positioned to arrange the ferrofluid by controlling a flow of the ferrofluid ejected from the source into a position at which the ferrofluid magnetically couples with the magnet to modify a parameter of an object coupled with or in the tool body when the tool body is positioned in a wellbore; and
a sensor, wherein the magnet is magnetically coupled with ferrofluid from the source to modify a position parameter of the ferrofluid relative to the tool body to calibrate the sensor.

17. The downhole system of claim 16, wherein the magnet is moveable relative to the tool body to modify the position parameter of the ferrofluid magnetically coupled with the magnet.

18. A downhole system comprising:
a tool body;
a magnet coupled with or in the tool body;
a source of ferrofluid positioned to arrange the ferrofluid by controlling a flow of the ferrofluid ejected from the source into a position at which the ferrofluid magnetically couples with the magnet to modify a parameter of an object coupled with or in the tool body when the tool body is positioned in a wellbore; and
a first communication device and a second communication device, wherein the magnet is magnetically coupled with ferrofluid from the source to modify a shape parameter of the ferrofluid relative to the tool body to provide a communication link between the first and the second communication devices.

19. The downhole system of claim 18, wherein the ferrofluid is arranged to carry communication signals through the ferrofluid between the first and the second communication devices.

20. The downhole system of claim 18, further comprising a system control center programmed with machine readable instructions to control at least one of the source of ferrofluid or the magnet in arranging the ferrofluid adjacent to or within the tool body by at least one of providing commands to the source to control the flow of ferrofluid or providing commands to the magnet to magnetically couple with the ferrofluid.

21. A system comprising:
a ferrofluid source positioned to eject ferrofluid;

a magnet magnetically coupled with the ferrofluid that is ejected by the ferrofluid source;

a ferrofluid collector positioned to collect the ferrofluid; and a system control center programmed with machine readable instructions to:

arrange the ferrofluid to modify a parameter of an object coupled with or in a tool body when the tool body is positioned in a wellbore by at least one of:

providing commands to the ferrofluid source to eject the ferrofluid; or providing commands to the magnet to magnetically couple with the ferrofluid; and provide commands to the ferrofluid collector to collect the ferrofluid so as to at least one of reduce a size parameter of the object or remove the object.

22. The system of claim 21, wherein the system control center is communicatively coupled with the ferrofluid source and programmed with machine-readable instructions to increase a size parameter of the object by providing commands to the ferrofluid source to eject the ferrofluid.

23. The system of claim 21, wherein the system control center is communicatively coupled with the ferrofluid collector and programmed with machine-readable instructions to reduce a size parameter of the object by providing commands to the ferrofluid collector to collect the ferrofluid.

24. The system of claim 21, wherein the object is made of the ferrofluid and the system control center is communicatively coupled with the ferrofluid collector and programmed with machine-readable instructions to remove the object by providing commands to the ferrofluid collector to collect the ferrofluid.

* * * * *